United States Patent
Tadepalli et al.

(10) Patent No.: US 6,366,432 B1
(45) Date of Patent: Apr. 2, 2002

(54) ACTUATOR ARM WITH TAPERED TRAILING EDGE AND RECESSED HEAD CONDUCTOR

(75) Inventors: Srinivas Tadepalli, Oklahoma City; Kenneth L. Pottebaum; Roy L. Wood, both of Yukon, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/698,812

(22) Filed: Oct. 26, 2000

Related U.S. Application Data

(60) Provisional application No. 60/162,268, filed on Oct. 28, 1999.

(51) Int. Cl.[7] .................................................. G11B 5/48
(52) U.S. Cl. .................................... 360/266; 360/264.2
(58) Field of Search ........................... 360/264.2, 265.7, 360/266, 245.8, 245.9

(56) References Cited

U.S. PATENT DOCUMENTS

| | | |
|---|---|---|
| 4,175,275 A | 11/1979 | Schaefer |
| 4,189,759 A | 2/1980 | Bauck et al. |
| 4,352,133 A * | 9/1982 | Hager .................... 360/266 |
| 4,819,094 A | 4/1989 | Oberg |
| 4,821,130 A | 4/1989 | Bernett et al. |
| 5,130,871 A | 7/1992 | Whitmore |
| 5,299,081 A | 3/1994 | Hatch et al. |
| 5,404,636 A | 4/1995 | Stefansky et al. |
| 5,446,611 A | 8/1995 | Webber |
| 5,461,525 A | 10/1995 | Christianson et al. |
| 5,627,701 A | 5/1997 | Misso et al. |
| 5,801,905 A | 9/1998 | Schirle et al. |
| 5,812,342 A | 9/1998 | Khan et al. |
| 5,825,590 A | 10/1998 | Ohwe |
| 5,850,319 A | 12/1998 | Tangren |
| 5,854,725 A | 12/1998 | Lee |
| 5,909,342 A * | 6/1999 | Forbord .................... 360/264.2 |
| 5,999,372 A | 12/1999 | Peterson et al. |

FOREIGN PATENT DOCUMENTS

JP        404079085 A        3/1992

* cited by examiner

Primary Examiner—A. J. Heinz
(74) Attorney, Agent, or Firm—Crowe & Dunlevy

(57) ABSTRACT

Apparatus for providing nominally laminar flow of air currents in a disc drive. An actuator supports a head adjacent a rotatable disc and includes a rigid actuator arm with opposing planar top and bottom surfaces and a pair of opposing tapered surfaces which taper to a trailing edge. The top, bottom and tapered surfaces define a cross-sectional enclosure to provide nominally laminar flow of air currents adjacent the actuator arm induced by rotation of the disc. A channel is formed in the enclosure by a plurality of adjoining recessed surfaces to at least partially recess a head conductor along the length of the actuator arm within the enclosure to prevent obstruction of the air currents by the conductor. The conductor is preferably a flex circuit with a semi-flexible dielectric layer which supports a plurality of conductive traces.

18 Claims, 5 Drawing Sheets

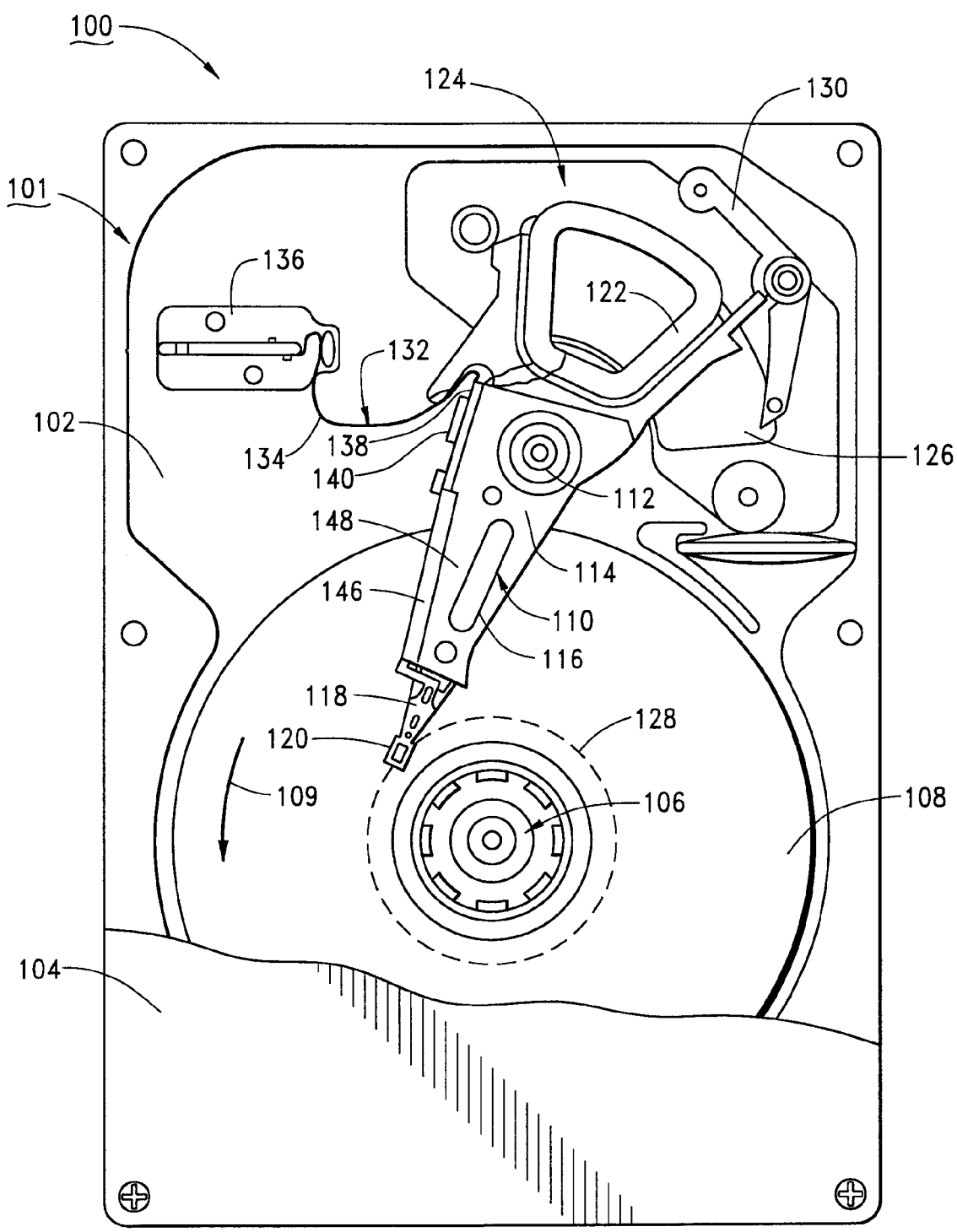
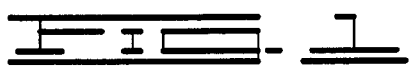

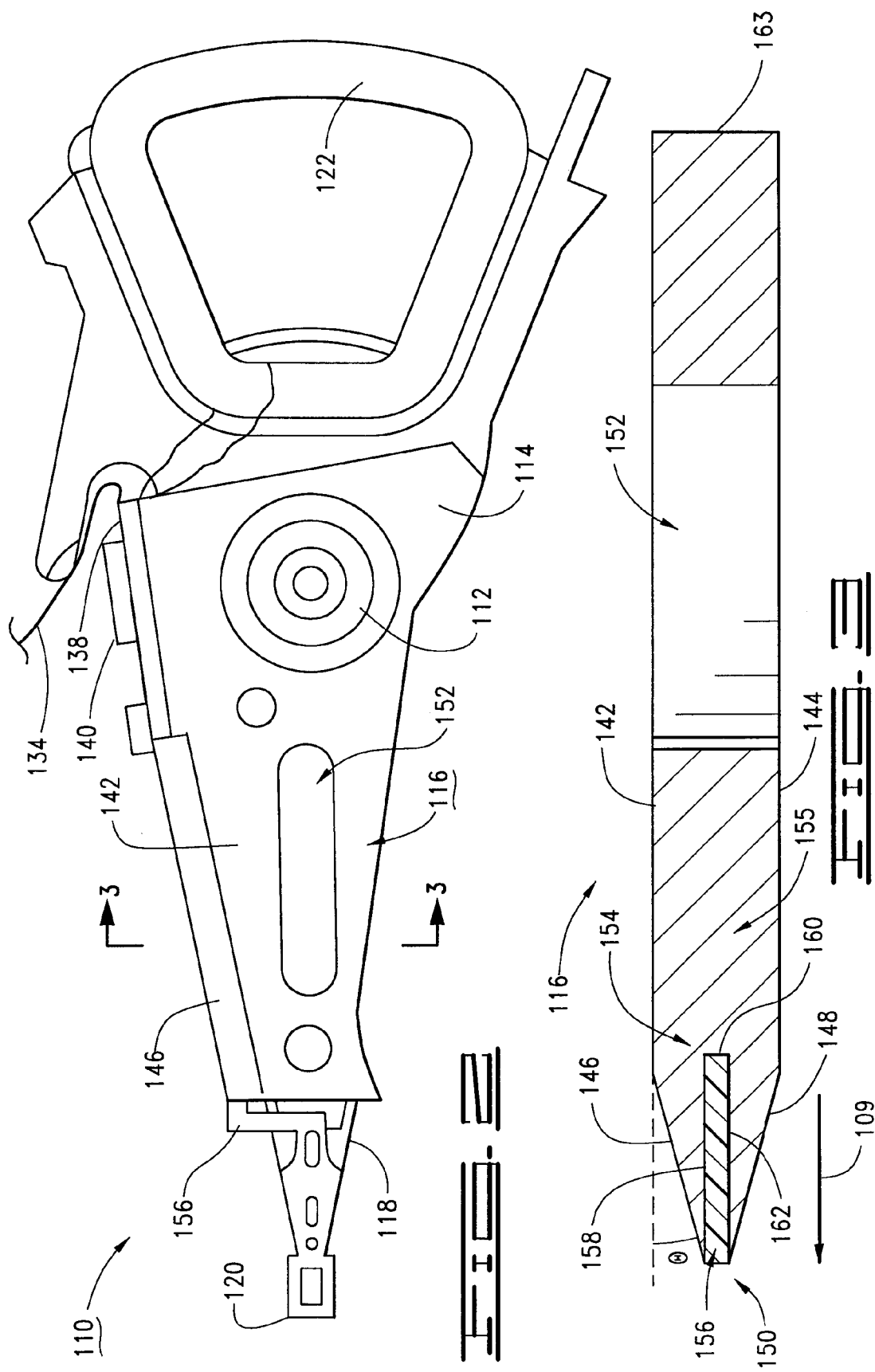

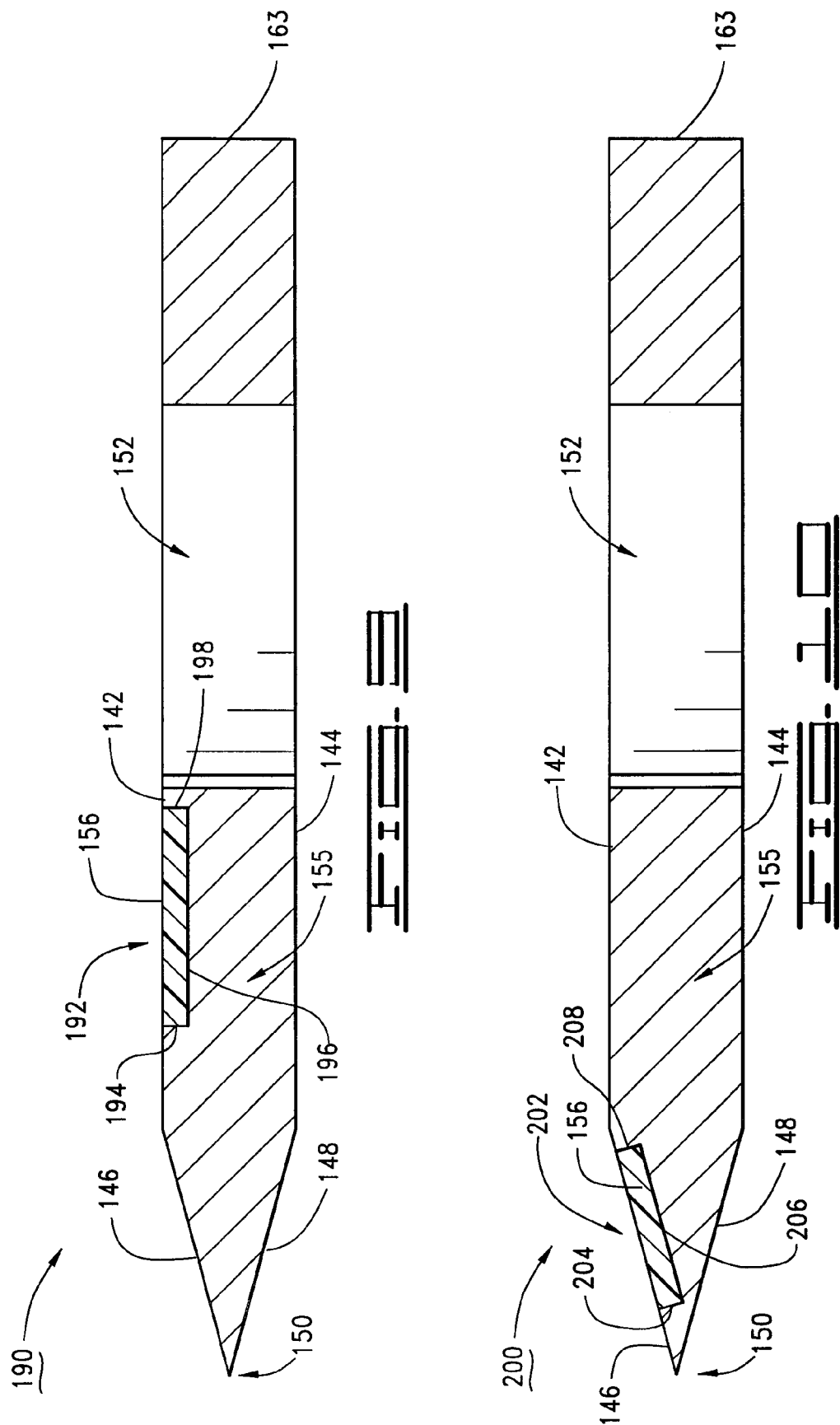

ACTUATOR ARM WITH TAPERED TRAILING EDGE AND RECESSED HEAD CONDUCTOR

RELATED APPLICATIONS

This application claims priority to United States Provisional Application No. 60/162,268 filed Oct. 28, 1999.

FIELD OF THE INVENTION

This invention relates generally to the field of magnetic data storage devices, and more particularly, but not by way of limitation, to an actuator arm used to support a head adjacent a magnetic recording disc of a disc drive, the actuator arm incorporating a tapered trailing edge and a recessed surface to recess a head conductor used to provide electrical communication with the head.

BACKGROUND

Disc drives are used as primary data storage devices in modern computer systems and networks. A typical disc drive comprises a head-disc assembly (HDA) which houses mechanical portions of the drive, and a printed circuit board (PCB) mounted to an outer surface of the HDA which supports electronic circuitry used to control the HDA and facilitate communication between the disc drive an a host computer in which the drive is mounted.

A typical HDA includes one or more rigid magnetic storage discs which are journaled about a rotary hub of a spindle motor to form a rotatable disc pack. An actuator supports an array of heads adjacent tracks defined on the disc surfaces.

A typical actuator construction utilizes an actuator body configured to rotate about a stationary shaft adjacent the disc pack. A coil of a voice coil motor (VCM) projects from the body opposite the discs and is immersed in the magnetic field of a magnetic circuit. The application of current to the coil induces rotation of the body about the shaft.

A plurality of rigid actuator arms project from the body toward the discs with one arm above the topmost disc, one arm below the bottommost disc, and one arm between each adjacent pair of discs. Flexible suspension assemblies ("flexures") are supported at the distal ends of the actuator arms and in turn support the heads adjacent the disc recording surfaces. Thus, for a fully populated configuration where data are stored to each available disc recording surface, the top and bottom actuator arms are each configured to support one flexure/head combination, and each intermediary actuator arm supports two flexure/head combinations. Conductors are routed along the edges of the actuator arms and flexures to enable electrical communication between the heads and the disc drive control PCB.

The high-speed rotation of the discs induces air currents that generally flow parallel to and in the direction of rotation of the discs. The heads are configured with aerodynamic features that enable the heads to be supported in close proximity to the rotating disc surfaces on air bearings established by the interaction of these aerodynamic features and the air currents.

An essentially laminar air flow is desired since air turbulence (also referred to herein as "windage") can increase the power consumption of the spindle motor, as well as degrade operational performance of the disc drive. Particularly, non-repeatable run out (NRRO) error in the placement of the heads adjacent the tracks can be readily induced by windage excitation of the actuator and discs. Such windage excitation arises from large-scale vortices that are shed in the wake of the actuator arms. These vortices are shed at Strouhal's frequency, which depends on the flow Reynolds number and the actuator geometry.

Such vortices transport the air flow and induce a forcing on the disc, increasing disc flutter (vibration) and power consumption. Further, such vortices, which move at slightly slower speed than the bulk of the mean flow, impinge upon the actuator and modify the mean flow. Vortex shedding frequency changes slightly due to the repeated impingement of the vortices on the actuator. This causes spectral broadening since the shedding frequency itself depends on the incident mean flow. Consequently, a significant amount of energy centered around the Strouhal's frequency contributes to off-track motion of the actuator.

Prior art efforts to improve laminar flow include disc shrouding, as well as the application of aerodynamically shaping to the actuator arms. Disc shrouding typically involves the placement of a circumferentially extending surface closely adjacent the outermost diameter of the disc pack to reduce windage at the disc boundaries. Aerodynamically shaped actuator arms typically incorporate tapered leading and/or trailing edges which are machined into or separately fabricated and affixed to the edges of the actuator arms. While the foregoing approaches have been operative to improve laminar flow, the continued increases in data aerial recording densities (with track densities of tens of thousands of tracks per radial centimeter) make continued advances highly desirable.

One problem with the aerodynamic shaping of the actuator arms relates to the placement and routing of the conductors used to communicate with the head. The use of magneto-resistive (MR) heads requires multiple conductive paths to facilitate separate write current and read bias current channels for each head. Such conductors can comprise twisted pairs of insulated electrical wire or, more recently, flex circuits comprising one or more semi-flexible dielectric layers which support and insulate electrically conductive traces. The conductors are typically routed along the trailing edges of the respective actuator arms and are supported by bracket flanges which protrude from the actuator arms. The conductors and brackets can thus induce windage effects and reduce the effectiveness of the aerodynamic shaping of the actuator arms.

As aerial recording densities continue to increase, there is a continued need to improve disc drive operational performance by reducing windage effects induced by an actuator, and it is to such improvements that the present invention is directed.

SUMMARY OF THE INVENTION

The present invention provides an apparatus for improving disc drive operational performance by reducing windage effects induced by an actuator used to controllably position a head adjacent a disc surface.

In accordance with preferred embodiments, a disc drive is provided with a rotatable actuator which supports one or more read/write heads adjacent a corresponding number of recording surfaces of a rotatable disc pack.

The actuator includes one or more rigid actuator arms that project from an actuator body toward the disc pack. Each actuator arm includes opposing planar top and bottom surfaces and a pair of opposing tapered surfaces which taper to a trailing edge. The top, bottom and tapered surfaces define a cross-sectional enclosure to provide nominally laminar flow of air currents adjacent the actuator arm induced by rotation of the disc pack.

A channel is formed in the enclosure by a plurality of adjoining recessed surfaces to recess a head conductor along the length of the actuator arm within the enclosure to prevent obstruction of the air currents by the conductor. The conductor is preferably a flex circuit with a semi-flexible dielectric layer which supports a plurality of conductive traces.

These and various other features and advantages which characterize the present invention will be apparent from a reading of the following detailed description and a review of the associated drawings.

BRIEF DESCRIPTION OF THE DRAWINGS

FIG. 1 is a top plan view of a disc drive constructed in accordance with preferred embodiments of the present invention.

FIG. 2 shows an actuator of the disc drive of FIG. 1, the actuator incorporating an actuator arm with an aerodynamically tapered trailing edge and a recessed surface to embeddingly support a flex circuit used to provide electrical communication paths with a head.

FIG. 3 provides a cross-sectional representation of the actuator arm along line 3—3 of FIG. 2.

FIG. 9 is a cross-sectional representation of an alternative construction for the actuator arm of FIG. 3.

FIG. 10 is a cross-sectional representation of yet another alternative construction for the actuator arm of FIG. 3.

DETAILED DESCRIPTION

Figure 4:
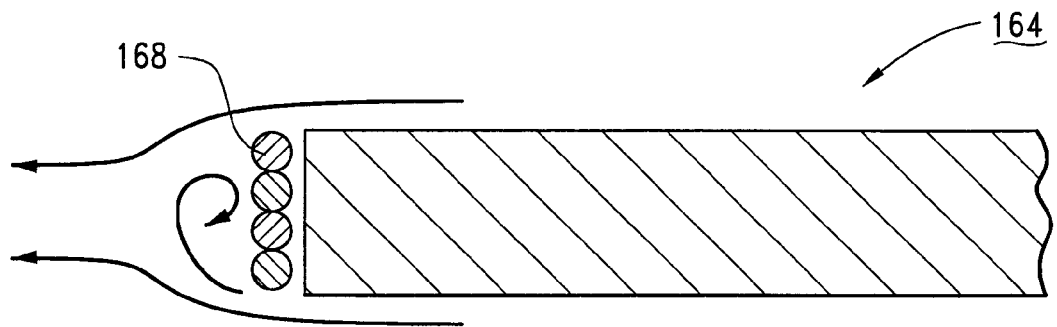
FIG. 4 provides a cross-sectional representation of a prior art actuator arm which uses twisted pairs of insulated conductive wire to establish head communication paths, and the windage effects induced thereby.

Referring to FIG. 1, shown therein is a top plan view of a disc drive 100 used to store computerized data. The disc drive 100 includes a head-disc assembly (HDA) 101 which houses various mechanical portions of the drive. A printed circuit board (PCB, not shown) is mounted to the underside of the HDA 101 to complete the disc drive 100, with the PCB supporting electronic circuits used to control the operation of the HDA 101.

The HDA 101 includes a base deck 102 and a top cover 104 (shown in partial cutaway fashion) which cooperate to form an enclosure with a controlled internal environment for the disc drive 100. A spindle motor 106 rotates one or more magnetic recording discs 108 in an angular direction indicated by arrow 109.

User data are written to and read from tracks (not depicted) on the discs 108 through the use of an actuator 110, which rotates about a bearing/shaft assembly 112 adjacent the discs 108. The actuator 110 includes an actuator body 114 from which project a plurality of rigid actuator arms 116 with aerodynamic features to be discussed below. The actuator arms 116 support flexible suspension assemblies 118 (flexures). A head 120 is supported at the end of each flexure 118, with each head configured to be aerodynamically supported over the discs 108 by air currents established by the rotation of the discs 108.

The actuator body 114 further supports an actuator coil 122 of a voice coil motor (VCM) 124. The actuator coil 122 is immersed in a magnetic circuit 126 of the VCM 124. Rotation of the coil 122, and hence the heads 120, is accomplished by the controlled application of current to the coil 122. The heads 120 come to rest and are secured upon texturized landing zones 128 by a magnetic latch 130 when the disc drive 100 is deactivated.

Electrical communication between the actuator 110 and the aforementioned disc drive PCB is established by a flex circuit assembly 132, which includes a flex circuit 134, a connector 136 which supportingly projects a distal end of the flex circuit 134 through an aperture (not shown) in the base deck 102 for interconnection with the PCB, and an actuator PCB 138 which supports a preamplifier/driver circuit ("preamp") 140 which applies write and read bias currents to the heads 120.

FIGS. 2 and 3 illustrate the actuator 110 of FIG. 1 in greater detail, with FIG. 3 showing a cross-sectional, elevational view of the actuator 110 along line 3—3 in FIG. 2. The actuator arm 116 includes opposing top and bottom surfaces 142, 144 which extend in directions substantially parallel to the discs 108 (FIG. 1) and opposing tapered, trailing edge surfaces 146, 148 which symmetrically extend from the respective surfaces 142, 144 to taper to a trailing edge 150.

The tapered surfaces 146, 148 are angled with respect to the surfaces 142, 144 by an angle 740, such as 15 degrees. The various surfaces 142, 144, 146 and 148 are preferably formed using a suitable machining operation from a unitary piece of material (such as aluminum), although the surfaces 146, 148 can alternatively be provided in a separate piece that is affixed to the actuator arm 116, or die cast into the arm. An optional aperture 152 (also commonly referred to as a "lightening hole") extends from the top surface 142 and the bottom surface 144 to reduce the mass of the actuator arm 116.

A channel 154 is formed within the cross-sectional enclosure defined by the surfaces 142, 144, 146 and 148 (this enclosure is indicated at 155). The channel 154 allows a planar flex circuit 156 used to provide electrical connection paths between the preamp 140 and the head 120 to be placed within the actuator arm 116 along the length of the arm. As will be recognized, recessing the flex circuit 156 within the confines of the enclosure of the actuator arm 116 prevents the flex circuit 156 from obstructing the flow of air currents and contributing to windage effects.

A suitable machining operation can be used to form recessed surfaces 158, 160 and 162 which cooperatively define the channel 154, after which the flex circuit 156 is inserted therein. Although a flex circuit is preferably used to establish the head communication paths, other configurations of conductors are also contemplated. However, use of a planar flex circuit (such as 156) is advantageous due to the relatively narrow thickness of the conductor (as compared, for example, to twisted pairs of wire) as well as the improved electrical transmission line characteristics (particularly for high speed data transfer signals). Since off-track excitation of the actuator 110 depends on the trailing edge thickness, a narrower channel is preferable, making a planar flex circuit a particularly advantageous choice for the conductor.

The width of the channel 154 (i.e., the distance between opposing recessed surfaces 158 and 162) is preferably selected to be as narrow as practicable while still large enough to accommodate the thickness of the flex circuit 156. Friction forces between the flex circuit 156 and the recessed surfaces 158, 162, as well as the relative tautness of the flex circuit 156 when installed, are contemplated as being sufficient in most cases to retain the flex circuit 156 within the channel 154; however, additional measures internal to the enclosure, such as the use of adhesive, can also be employed if further retention forces for the flex circuit 156 are required.

The leading edge of the actuator arm 116 (defined by surface 163) is not shown to incorporate tapering, although such tapering of the surface 163 can also be applied. For disc rotational speeds employed by present generation disc drives (which presently range from about 5400 to over 10,000 revolutions per minute), it has been found that windage effects generally arise from discontinuities at the trailing edge, not the leading edge. Aerodynamic shaping of the leading edges of actuator arms becomes increasingly advantageous, however, with higher disc rotational speeds (such as above 20,000 revolutions per minute).

Figure 5:
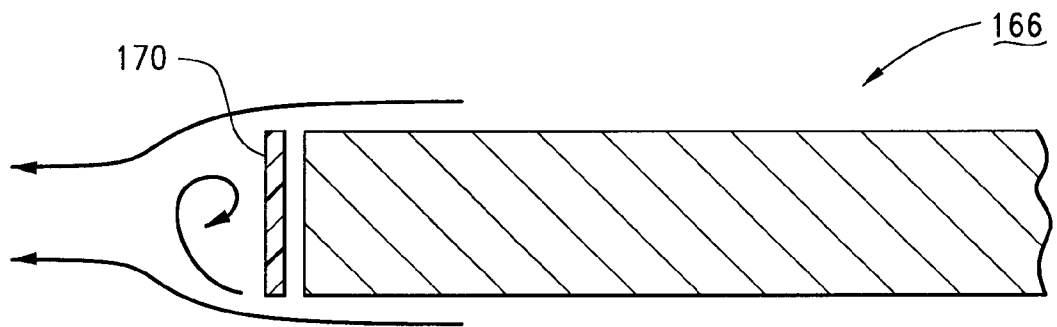
FIG. 5 provides a cross-sectional representation of a prior art actuator arm which uses a flex circuit to establish head communication paths, and the windage effects induced thereby.
Figure 6:
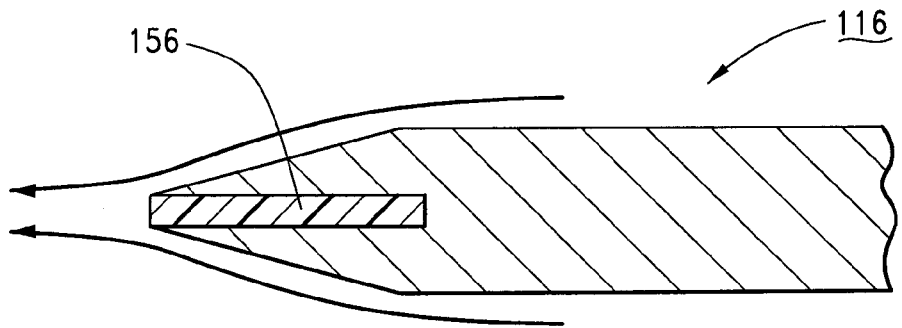
FIG. 6 provides a cross-sectional representation of the actuator arm of FIG. 3, illustrating the improvements in laminar flow provided by the embedded flex circuit.

The tapering of the actuator arm 116 and the embedding of the flex circuit 156 substantially wholly within the cross-sectional enclosure of the actuator arm 116 permits a substantial improvement in laminar flow across the actuator arm 116 over the prior art. For example, FIGS. 4 and 5 provide cross-sectional representations of prior art actuator arms 164, 166 which respectively employ twisted pairs of electrical wire 168 and flex circuit 170 to establish the requisite head connections. Brackets or similar features used to retain the wires 168 and flex circuit 170 to the respective arms 164, 166 have not been shown for clarity, but it will be understood that such features typically further contribute to the undesired windage effects illustrated therein. By contrast, FIG. 6 illustrates a substantially laminar flow about the trailing edge of the actuator arm 116.

Figure 7:
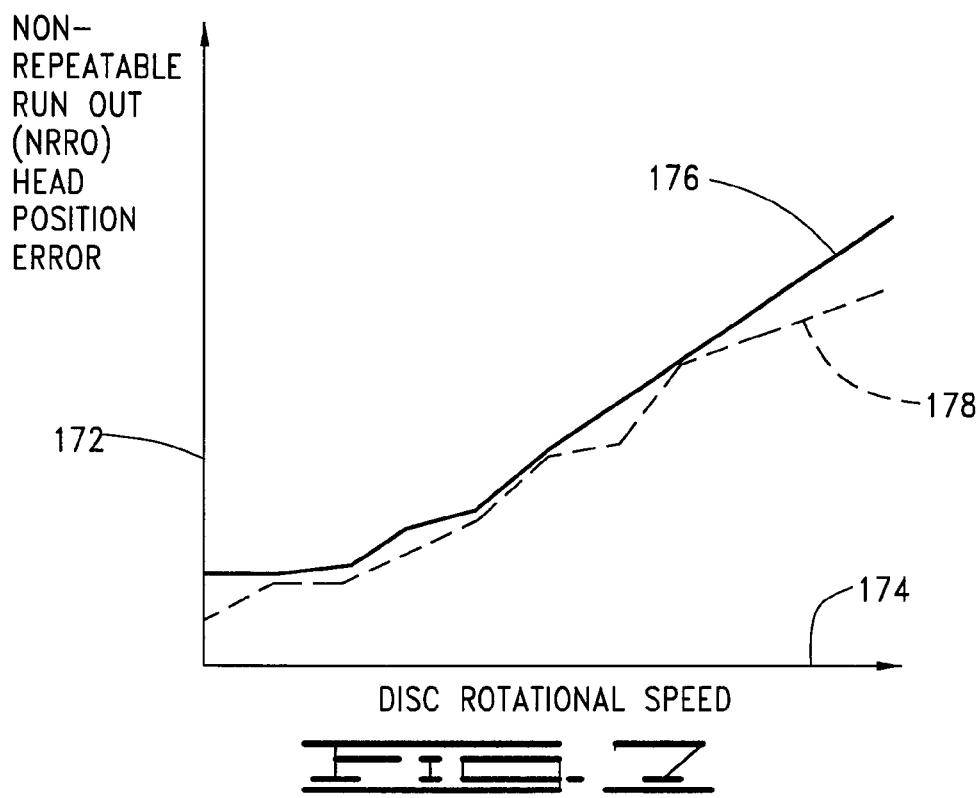
FIG. 7 is a generalized graphical comparison of non-repeatable run out (NRRO) error in head position using the prior art actuator arm configuration of FIG. 5 and the actuator arm configuration of FIG. 6.
Figure 8:
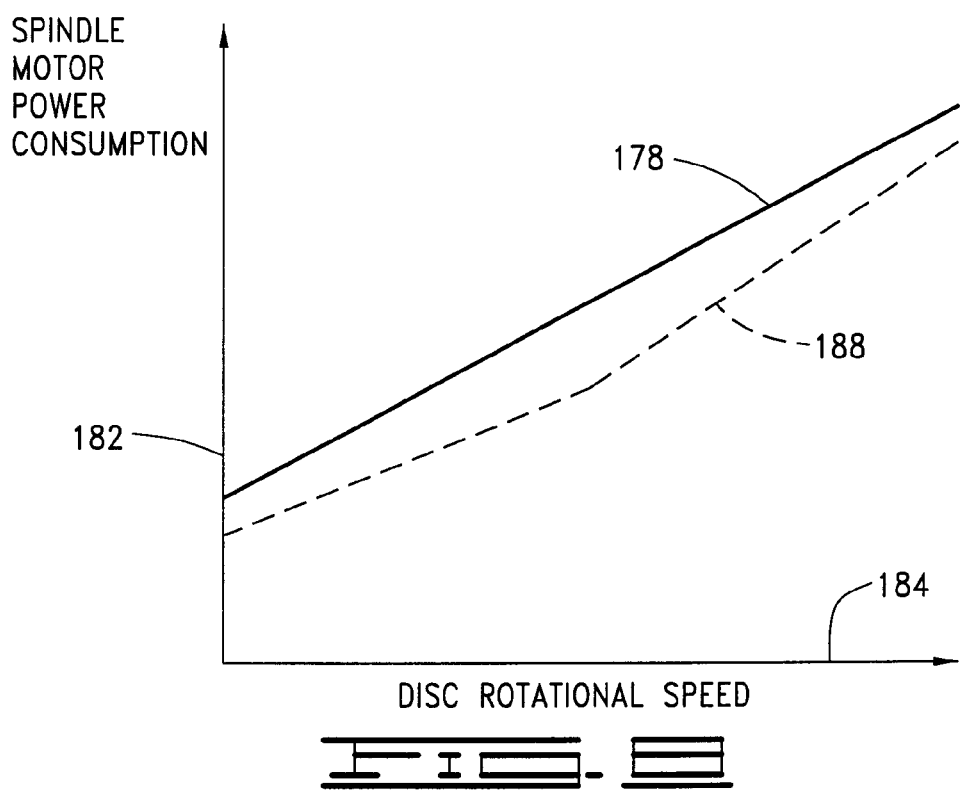
FIG. 8 is a generalized graphical comparison of power consumption of a spindle motor using the prior art actuator arm configuration of FIG. 5 and the actuator arm configuration of FIG. 6.

FIGS. 7 and 8 graphically illustrate the advantages of the actuator arm 116 as compared to the prior art. FIG. 7 provides a plot of non-repeatable run out (NRRO) head position error (y-axis 172) versus disc rotational speed (x-axis 174) for the prior art configuration of FIG. 5 (solid curve 176), and the actuator arm 116 (dashed curve 178). From FIG. 7 it can be readily seen that windage effects upon head position are reduced using the actuator arm 116. It will be noted that a continued trend in the disc drive industry is to provide disc drives with ever higher disc rotational speeds; hence, FIG. 7 suggests that the advantages of the actuator arm 116 will generally become more accentuated as rotational speeds are further increased.

FIG. 8 provides a plot of spindle motor power consumption (y-axis 182) versus disc rotational speed (x-axis 184) for the prior art configuration of FIG. 5, solid curve 186, and the actuator arm 116, dashed curve 188. It will be noted that the actuator arm 116 also provides a substantial improvement over the prior art by reducing the power consumption requirements of the disc drive, an important feature especially in portable applications that use battery packs as a power source.

FIGS. 9 and 10 provide alternative preferred configurations for the actuator arm 116. For clarity, reference numerals used in FIGS. 2 and 3 will likewise be used for similar elements in FIGS. 9 and 10. FIG. 9 illustrates an elevational, cross-sectional view of an actuator arm 190 having a channel 192 formed in the top surface 142 by recessed surfaces 194, 196 and 198 to accommodate the flex circuit 156. FIG. 10 illustrates an elevational, cross-sectional view of an actuator arm 200 having a channel 202 formed in the tapered surface 146 by recessed surfaces 204, 206 and 208 to accommodate the flex circuit 156. In these embodiments, the top surface (not designated) of the flex circuit 156 is nominally aligned with the top surface 142 (FIG. 9) or the tapered surface 146 (FIG. 10) so that these embodiments provide substantially the same laminar flow characteristics as the actuator arm 116. It will be understood that the flex circuit 156 could readily be placed in other locations, such as in the bottom surface 144 or tapered surface 148. It will be noted that the channel 154 of FIG. 3 extends into both of the tapered surfaces 146, 146 at the trailing edge 150. As previously mentioned, since off-track excitation is a function of trailing edge thickness, the configurations of FIGS. 9 and 10 are particularly advantageous since the opposing tapered surfaces can be brought to a sharp point along the lengths of the arms.

From the foregoing discussion, it will now be clear that the present invention is directed to an apparatus for providing nominally laminar flow of air currents in a disc drive.

In accordance with preferred embodiments, an actuator 110 supports a head 120 adjacent a rotatable disc 108 and includes a rigid actuator arm 116, 190, 200 with opposing planar top and bottom surfaces 142, 144 and a pair of opposing tapered surfaces 146, 148 which extend from the top and bottom surfaces to taper to a trailing edge 150. The top, bottom and tapered surfaces define a cross-sectional enclosure 155 to provide nominally laminar flow of air currents adjacent the actuator arm induced by rotation of the disc (see FIG. 6).

A channel 154, 192, 202 is formed in the enclosure by a plurality of adjoining recessed surfaces 158, 160, 162 (FIG. 3); 194, 196, 198 (FIG. 9); 204, 206. 208 (FIG. 10) to recess a head conductor 154 along the length of the actuator arm at least partially within the enclosure to prevent obstruction of the air currents by the conductor. The conductor is preferably a flex circuit with a semi-flexible dielectric layer which supports a plurality of conductive traces.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An actuator configured for use in a disc drive having a rotatable disc surface, the actuator comprising:
   an actuator body pivotable about an axis;
   a head configured to transduce data from the disc surface;
   a conductor configured to transmit electrical signals to the head; and
   a rigid actuator arm which projects from the actuator body to support the head over the disc surface and having opposing planar top and bottom surfaces and a pair of opposing tapered surfaces respectively extending from the top and bottom surfaces to taper to a trailing edge to provide substantially laminar flow of air currents past the actuator arm, wherein the top, bottom and tapered surfaces cooperatively define a cross-sectional enclosure into which a plurality of adjoining recessed surfaces extend to form a channel which extends along a length of the actuator arm, the channel receiving the conductor at least partially within the enclosure so that the conductor generates a reduced drag.

2. The actuator of claim 1, wherein the channel is formed in a selected one of the top and bottom surfaces.

3. The actuator of claim 1, wherein the channel is formed in a selected one of the tapered surfaces.

4. The actuator of claim 1, wherein the channel is formed in both of the tapered surfaces so that a trailing edge of the flex circuit is aligned with the trailing edge of the actuator arm.

5. The actuator of claim 1, wherein the conductor comprises a flex circuit comprising a semi-flexible dielectric layer which supports and insulates a plurality of electrically conductive traces.

6. The actuator of claim 1, wherein the channel has a cross-sectional area sufficient to receive the conductor entirely.

7. A disc drive, comprising:
a rotatable disc having a disc surface; and
an actuator adjacent the disc, comprising:
an actuator body pivotable about an axis;
a head configured to transduce data from the disc surface;
a conductor configured to transmit electrical signals to the head; and
a rigid actuator arm which projects from the actuator body to support the head over the disc surface, the actuator arm comprising:
opposing planar top and bottom surfaces;
a pair of opposing tapered surfaces which respectively extend from the top and bottom surfaces to a trailing edge, the top, bottom and tapered surfaces defining a cross-sectional enclosure to provide nominally laminar flow of air currents adjacent the actuator arm induced by rotation of the disc; and
a plurality of adjoining recessed surfaces which extend into the enclosure to form a channel which extends along a length of the actuator arm, the channel receiving the conductor at least partially within the enclosure so that the conductor generates a reduced drag.

8. The disc drive of claim 7, wherein the channel is formed in a selected one of the top and bottom surfaces.

9. The disc drive of claim 7, wherein the channel is formed in a selected one of the tapered surfaces.

10. The disc drive of claim 7, wherein the channel is formed in both of the tapered surfaces so that a trailing edge of the flex circuit is aligned with the trailing edge of the actuator arm.

11. The disc drive of claim 7, wherein the conductor comprises a flex circuit comprising a semi-flexible dielectric layer which supports and insulates a plurality of electrically conductive traces.

12. The disc drive of claim 7, wherein the channel has a cross-sectional area sufficient to receive the conductor entirely.

13. A disc drive, comprising:
a rotatable disc having a disc surface; and
an actuator adjacent the disc, comprising:
an actuator body pivotable about an axis;
a head configured to transduce data from the disc surface;
a conductor configured to transmit electrical signals to the head;
a rigid actuator arm which projects from the actuator body to support the head over the disc surface; and
means for providing a nominally laminar flow of air currents passing adjacent the actuator arm and for recessing the conductor at least partially within the actuator arm to reduce an obstruction of the air currents by the conductor.

14. The disc drive of claim 13, wherein the actuator arm comprises
opposing planar top and bottom surfaces and wherein the means for providing and recessing comprises:
a pair of opposing tapered surfaces which respectively extend from the top and bottom surfaces to a trailing edge, the top, bottom and tapered surfaces defining a cross-sectional enclosure; and
a plurality of adjoining recessed surfaces which extend into the enclosure to form a channel which extends along a length of the actuator arm, the channel housing the conductor within the enclosure so that the conductor does not obstruct the air currents.

15. The disc drive of claim 14, wherein the channel is formed in a selected one of the top and bottom surfaces.

16. The disc drive of claimed 14, wherein the channel is formed in a selected one of the tapered surfaces.

17. The disc drive of claim 14, wherein the channel is formed in both of the tapered surfaces so that a trailing edge of the flex circuit is aligned with the trailing edge of the actuator arm.

18. The disc drive of claim 13, wherein the conductor comprises a flex circuit comprising a semi-flexible dielectric layer which supports and insulates a plurality of electrically conductive traces.

* * * * *